United States Patent

Netravali et al.

Patent Number: 5,734,432
Date of Patent: Mar. 31, 1998

[54] METHOD OF INCORPORATING A VARIABLE RATE AUXILIARY DATA STREAM WITH A VARIABLE RATE PRIMARY DATA STREAM

[75] Inventors: Arun Narayan Netravali, Westfield; Eric David Petajan, Watchung, both of N.J.

[73] Assignee: Lucent Technologies, Inc., Murray Hill, N.J.

[21] Appl. No.: 276,069

[22] Filed: Jul. 15, 1994

[51] Int. Cl.⁶ .................................................. H04N 7/18
[52] U.S. Cl. ........................ 348/417; 348/461; 348/462
[58] Field of Search .................................. 348/419, 416, 348/415, 405, 407, 423, 432, 474, 473, 406, 461, 462; 370/110.4, 115

[56] References Cited

U.S. PATENT DOCUMENTS

| | | | |
|---|---|---|---|
| 4,237,484 | 12/1980 | Brown et al. | 358/142 |
| 4,852,084 | 7/1989 | Verbiest et al. | 370/60 |
| 5,043,808 | 8/1991 | Knauer et al. | 358/133 |
| 5,063,444 | 11/1991 | Knauer et al. | 358/133 |
| 5,083,206 | 1/1992 | Knauer et al. | 358/141 |
| 5,111,292 | 5/1992 | Kuriacose et al. | 348/416 |
| 5,134,475 | 7/1992 | Johnston et al. | 358/133 |
| 5,134,477 | 7/1992 | Knauer et al. | 358/136 |
| 5,136,377 | 8/1992 | Johnston et al. | 358/136 |
| 5,144,423 | 9/1992 | Knauer et al. | 358/133 |
| 5,159,447 | 10/1992 | Haskell et al. | 348/418 |
| 5,196,933 | 3/1993 | Henot | 348/416 |
| 5,289,276 | 2/1994 | Siracusa et al. | 348/416 |
| 5,349,383 | 9/1994 | Parke et al. | 348/409 |
| 5,369,669 | 11/1994 | Tombal et al. | 370/110.4 |
| 5,430,485 | 7/1995 | Lankford et al. | 348/423 |
| 5,461,619 | 10/1995 | Citta et al. | 348/423 |
| 5,481,543 | 1/1996 | Veltman | 370/94.1 |
| 5,493,339 | 2/1996 | Birch et al. | 348/461 |

*Primary Examiner*—Tommy P. Chin

[57] ABSTRACT

A method of incorporating an auxiliary signal with an input video signal includes the step of encoding the input video signal to generate a variable bit rate encoded signal having a selected level of distortion. The video signal is applied to a buffer. The level of distortion is selected as a function of the fullness of the buffer. The video signal is read from the buffer and applied to a transmission channel at a predetermined video output rate. Portions of an auxiliary signal are applied to the channel at times when the buffer is in an underflow condition. The selected level of distortion has a flow which corresponds to a predetermined, non-zero level of perceptual distortion in the video signal.

7 Claims, 2 Drawing Sheets

METHOD OF INCORPORATING A VARIABLE RATE AUXILIARY DATA STREAM WITH A VARIABLE RATE PRIMARY DATA STREAM

BACKGROUND OF THE INVENTION

The present invention relates to the transmission of primary and auxiliary digital data streams over a broadcast channel.

Systems, such as HDTV systems, use encoding techniques to extract redundancies from video signals which are transmitted as video frames from a transmitter to a receiver. The amount of information contained in the encoded video signals tends to be variable, resulting in a bursty signal. For example, scenes involving a lot of action, such as basketball footage, contain less frame-to-frame redundant information, and therefore tend to produce a larger amount of encoded information or data, than the amount of encoded data required to transmit subsequent frames of a still picture, which contain primarily redundant information.

For transmission using a limited-bit-rate channel, an HDTV encoder must produce a constrained constant bit rate. In order to ensure a constant bit rate output, a buffer is associated with the HDTV transmitter which accumulates the bursty video signals and controls the rate at which the bitstream is transmitted. If there is a break in the transmission of the bitstream generated by the HDTV transmitter such that the buffer becomes empty, partial or total loss of picture results.

In an HDTV system, video data are received from a data source and compressed by a video encoder. Among other things, the video encoder determines the level, i.e. coarseness of quantization of the video data stream. The video data are then transmitted to a buffer. The buffer controls the output rate of the video data stream. The fullness of the buffer is controlled by distortion control via a feedback mechanism. The distortion control controls the level of distortion, i.e., the coarseness or fineness of the video data, for each video frame which, in turn, effects the level of, i.e., makes more coarse, the quantization of the encoded video data. When the buffer fills up to a point above some reference level, the distortion control causes the encoder to increase the level of quantization of the video data stream, thereby reducing buffer fullness. When the buffer fullness falls below some reference level, the distortion control causes the encoder to reduce the level of quantization of the video data stream, thereby increasing buffer fullness. In the event of buffer underflow, i.e., so many more bits leave the buffer than enter the buffer that the buffer empties.

SUMMARY OF THE INVENTION

In the prior art, the buffer as a practical matter rarely empties even when a highly redundant image, such as a still image, is being sent. The reason is that even a still image contains noise which gives rise to some frame-to-frame differences which cause the encoder to increase the level of quantization.

We have recognized that by establishing a floor on the allowed level of distortion, the buffer tends to more frequently realize an underflow condition. Auxiliary data representative of data services, such as electronic publications, can be transmitted during the underflow condition. While having a floor on the distortion level tends to increase the level of quantization of the video data stream compared to what a prior art system would do resulting in reduced picture quality over that which the prior art could achieve, the floor is established at such a level that the picture quality is acceptable to the human eye.

DETAILED DESCRIPTION

Figure 1:
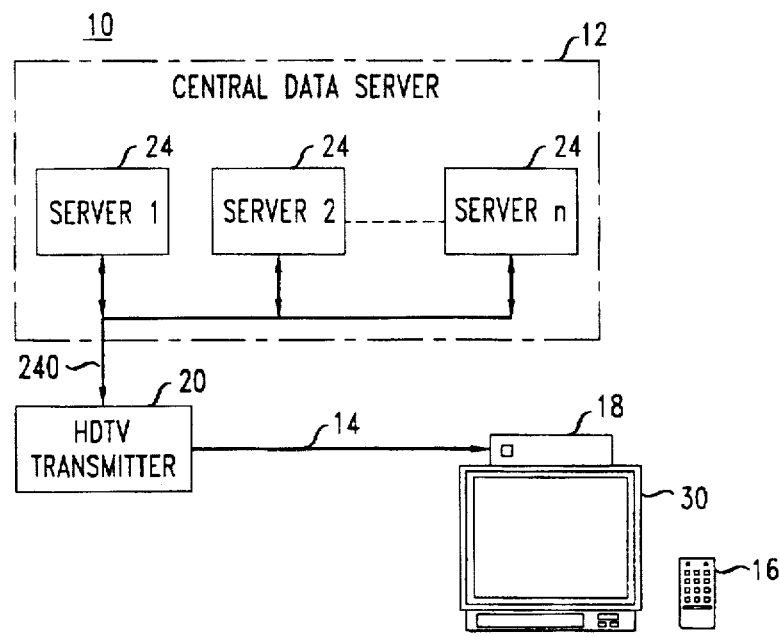
FIG. 1 illustrates a schematic diagram of an HDTV system implemented in accordance with the present invention.

A general overview of a video system, illustratively a high definition television (HDTV) system 10, incorporating the principles of the present invention is illustrated in FIG. 1. The details of an HDTV video system are described in such U.S. Pat. Nos. as 5,144,423 entitled "HDTV Encoder with Forward Estimation and Constant Rate Motion Vectors" issued Sep. 1, 1992 to Knauer et al.; 5,136,377 entitled "Adaptive Non-linear Quantizer", issued Aug. 4, 1992 to Johnston et al.; 5,134,475 entitled "Adaptive Leak HDTV Encoder", issued Jul. 28, 1992 to Johnston et al.; and 5,134,477 entitled "HDTV Receiver" issued Jul. 28, 1992 to Knauer et al.—all of which are incorporated by reference.

In operation, a viewer sends instructions to a central data server 12 to identify one or more data services that are desired to be received. The instructions are transmitted from the viewer's remote location to the central server 12 by means of a cable or fiber optic network 14. For example, the instructions might be transmitted as infra-red signals via a remote control unit 16 to a set-top box 18 associated with receiver 30 which transmits the appropriate signals over the network 14. Alternatively, the viewer could transmit his instructions to central server 12 over a standard telephone network (not shown). A separate data service converter box (not shown) may be used in place of the set-top box 18 to transmit the instructions over network 14.

The central server 12 processes the incoming requests from the viewers and retrieves the data desired by the viewers from a respective one of servers 24. The data services can be any type of video or audio information such as, but not limited to, electronic newspapers, magazines, catalogs, movies transmitted to a storage device, or other types of services which are not required to be transmitted in real time. The data is transmitted to the set-top box 18. The set-top box 18 includes storage means, such as memory, for storing the data. Once a significant portion of the data has been transmitted to the set-top box 18, the service can be viewed by the viewer. Set-top box also receives video signals over network 14 from a central HDTV transmitter 20.

While the data is being transmitted to the viewer's set-top box 18, the viewer is still capable of viewing programs broadcast from the HDTV transmitter 20. In accordance with the present invention, HDTV video signals and the data signals are multiplexed together in such a manner that the HDTV video signals are transmitted in real time and the data service signals are transmitted to the set-top box at a slower rate. As such, the HDTV signals are the primary signals broadcast to the set-top box 18 and the data signals are treated as auxiliary signals as will be described in detail hereinafter.

Figure 2:
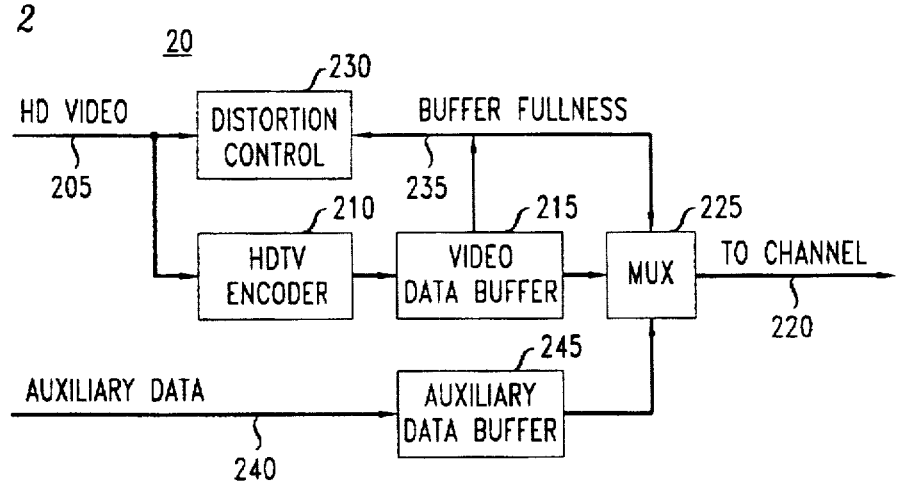
FIG. 2 illustrates a block diagram of the HDTV transmitter of the HDTV system of FIG. 1.

FIG. 2 is a more detailed block diagram of the HDTV transmitter 20 shown in FIG. 1. A high-definition (HD) video signal on lead 205 is encoded by an HDTV encoder 210. As is well known, an HDTV encoder-indeed, most video encoders—provides a variable-bit-rate output depending on the nature of the video signal being encoded. For example, a video signal which is changing by a relatively small amount from frame to frame can be encoded with fewer bits than when the frame to frame differences are relatively great, as when there is a lot of motion in the image. A sharp scene change also causes the encoder output bit rate to increase for a time. However, while small scene changes require fewer bits than drastic scene changes, noise present in the video signals causes the image to become distorted. As a result, the number of bits required to encode the scene changes is significant.

As a result of the above-described variability in the output bit rate of encoder 210, its output is buffered in a video data buffer 215 so that an appropriately formatted HDTV signal can be developed and applied to the broadcast channel 220. Interposed between video data buffer 215 and channel 220 is a multiplexer 225 whose function will be explained momentarily.

The system also includes distortion control 230 which receives as its inputs the incoming video signal from lead 205 as well as a "buffer fullness" signal on lead 235 provided by buffer 215. The function and structure of distortion control 230 are well known in the art. The distortion control 230 determines the degree of coarseness to which a video signal is encoded-its distortion level-taking into consideration factors, such as, but not limited to, discrete cosine transform (DCT) coefficients, motion vectors and the level of quantization. The coded video signal must contain enough information so that the coded image maintains the integrity of the original image. However, that measurement of integrity is subject to the constraint that the coded image will be viewed by a human observer who will not be aware of small distortions in the coded image. As long as the human observer can not detect distortions resulting from the coding of the image, the distortion level is considered to be within an acceptable range.

The distortion level is dependent on a perceptual distortion metric. The perceptual distortion metric provides a measurement by which the degree of fineness to which the video signals are encoded may be determined so that the distortion present in the coded image appears, to a human observer, to be uniformly distributed. In accordance with the present invention, the perceptual distortion metric is set at such a level that a floor is established for the distortion level. Thus, while the image may be capable of being more finely encoded, such encoding would not be perceptible to the human observer.

Figure 4:
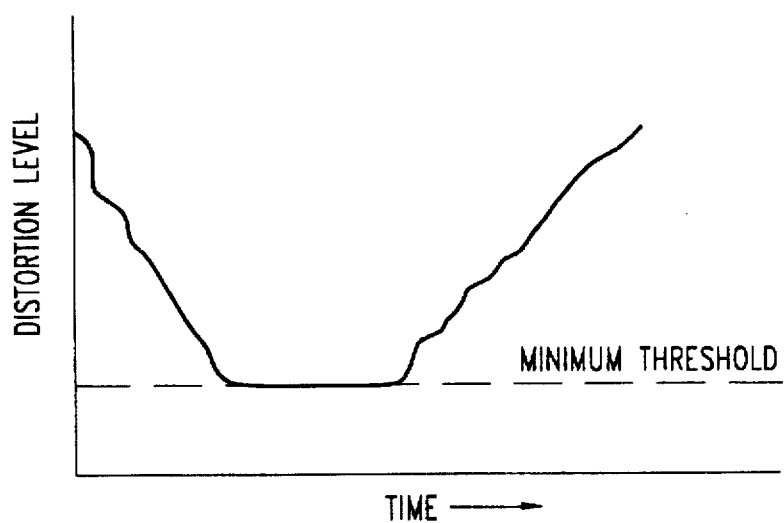
FIG. 4 illustrates a graph depicting a measurement of the distortion level over time t.
Figure 5:
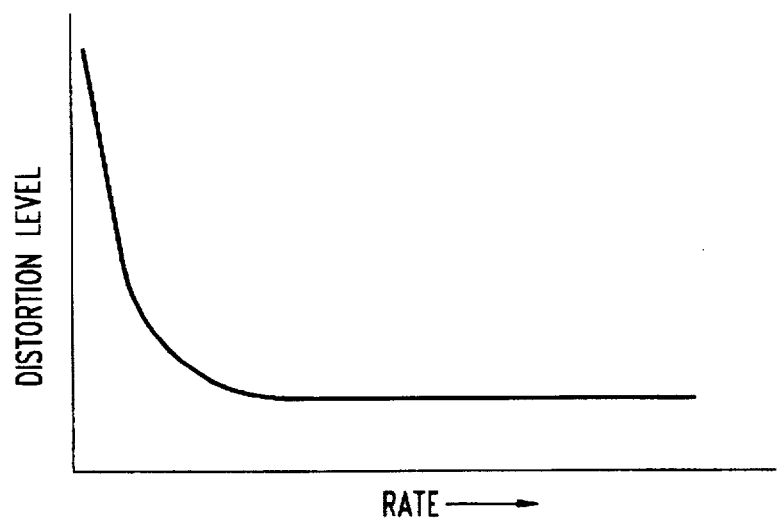
FIG. 5 illustrates a graph depicting the relationship between the level of distortion and bit rate.

The relationship between the distortion level and the bit rate of the encoded video signal is illustrated in FIG. 5. The distortion level and the bit rate have a generally inverse relationship. When the distortion level is high, the rate is low. When the distortion level is low, the rate is high. By setting a perceptual distortion metric which limits how "undistorted" the video is made to be, thereby establishing a distortion floor, the maximum amount of encoding, i.e., the degree of fineness to which the video signal is encoded, can be limited. As shown in FIG. 4, over time the distortion level tends to decrease. However, when the distortion floor is reached, the degree of fineness of the encoding associated with the distortion level is maintained until the video image changes or there is an increase in scene complexity, at which point the distortion level is allowed to increase in order to accommodate the resulting increase in the coded bit rate.

A consequence of establishing a floor on the distortion level is that over time, the buffer fullness will decrease. In accordance with the present invention, the distortion floor, which corresponds to predetermined, non-zero level of perceptual distortion in the video signal, is set at such a level that the buffer will regularly achieve an underflow condition. During the underflow condition, auxiliary data from auxiliary data buffer 245 are transmitted and transmission of the video signals is suspended. When the buffer fills above a predetermined level, transmission of auxiliary data is suspended and transmission of the video signals is resumed.

By creating artificial underflow conditions in this way, the amount of auxiliary data which may be transmitted is increased over the prior art. In particular, at various points in the encoding of the video signal, such as during "stills" and periods of relatively slow movement, and/or when particular types of video signals are being encoded, such as 24- or 30-frame/second film, the full data rate capability of the channel may not be taken up by the number of bits being supplied to, and ultimately read out of, video data buffer 215. The system thus has the ability during such periods to accommodate the transmission of auxiliary data that would not otherwise be able to be accommodated.

Specifically, then, the system receives an auxiliary data bit stream on lead 240. The bits of this data stream are buffered in auxiliary data buffer 245 whose output feeds into multiplexer 225. In accordance with one embodiment, the system may provide a minimum constant bit-rate capability to establish a minimum bit-rate of auxiliary data by dedicating a portion of the video channel exclusively to the transmission of auxiliary data. That is, bits from auxiliary data buffer 245 are continuously read therefrom at at least a predetermined minimum rate and multiplexed with the HDTV-encoded signal for presentation to channel 220. However, as described above, when the video data buffer is empty—or, perhaps in other embodiments, almost empty-indicating that the channel capacity is not being fully utilized by the current combined level of bits being output by HDTV encoder 210 and auxiliary data buffer 245, multiplexer 225 increases the rate at which it takes auxiliary data bits from buffer 245. Later, as video data buffer 215 begins to fill, the rate of auxiliary data taken from data buffer 245 is decreased—ultimately to the aforementioned minimum constant bit rate.

Figure 3:
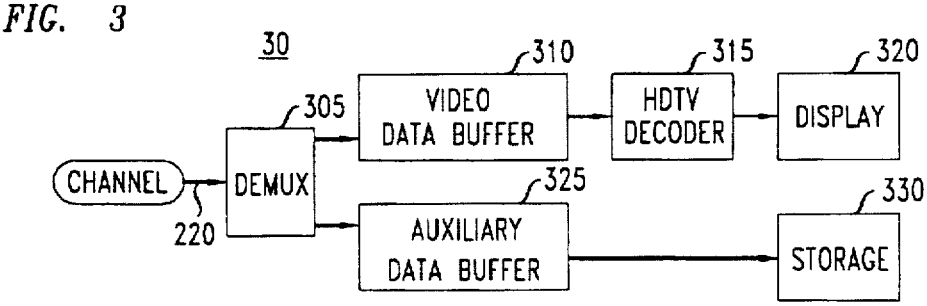
FIG. 3 illustrates a block diagram of the HDTV receiver of the HDTV system of FIG. 1.

FIG. 3 further illustrates a more detailed block diagram of the HDTV receiver 30. At the far end of the channel, the composite video/auxiliary data signal is demultiplexed by demultiplexer 305. The received HDTV video signal is applied to video data buffer 310, then to HDTV decoder 315, and ultimately to a display 320 while the received auxiliary data is applied to auxiliary data buffer 325 and then to a storage device 330. That storage device 330 might be the display 320 on which the HDTV signal is displayed or could be a virtual set-top box which can transmit the data to any kind of end-use device.

The broadcast industry has indicated that digital data services will be a valuable part of HDTV. Advantageously, this arrangement provides a useful way of delivering such services. In particular, the ability to transmit auxiliary data along with the HDTV signal provides the capability of delivering such services as electronic newspapers and magazines, electronic catalogues, paging services, stock quotes and program guides, as well as additional audio and/or video channels.

It will be appreciated that those skilled in the art will be able to devise numerous and various alternative arrangements which, although not explicitly shown or described herein, embody the principles of the invention and are within its scope and spirit.

We claim:

1. A method comprising the steps of:
    encoding an input video signal to generate a variable-bit-rate encoded signal having a selected level of distortion,
    applying said video signal to a buffer, said level of distortion selected as a function of fullness of said buffer,
    reading said video signal from said buffer and applying it to a transmission channel at a predetermined video output rate, and
    regulating an auxiliary signal such that portions of said auxiliary signal are applied to said channel only at times when said buffer is in an underflow condition,
    wherein said selected level of distortion has a floor which corresponds to a predetermined, non-zero level of perceptual distortion in said video signal and which is higher than that required for buffer fullness control, such that more frequent buffer underflow conditions and transmission of auxiliary signals result.

2. The method of claim 1 wherein said predetermined, non-zero level of perceptual distortion is such that underflow condition occurs often enough that said auxiliary signal can be applied to said channel at at least a predetermined auxiliary data rate.

3. The method of claim 1 wherein said step of encoding an input video signal comprises the step of:
    generating a perceptual distortion metric indicative of a desired level of distortion for the encoded signal, said perceptual distortion metric being a function of the fullness of said buffer.

4. A method comprising the steps of:
    encoding an input video signal to generate a variable-bit-rate encoded signal, said encoding including generating a perceptual distortion metric indicative of a desired level of distortion for the encoded signal and encoding said input video signal to achieve said desired level of distortion,
    applying said video signal to a buffer, said perceptual distortion metric being a function of fullness of said buffer,
    reading said video signal from said buffer and applying it to a transmission channel at a predetermined video output rate, and
    regulating an auxiliary signal such that portions said auxiliary signal are applied to said channel only at times when said buffer is in an underflow condition, and
    wherein said perceptual metric has a non-zero floor whose value is higher than that required for buffer fullness control, such that an application of said auxiliary signal to said channel occurs at a predetermined average bit rate and more frequent buffer underflow conditions and transmission of auxiliary signals result.

5. The method of claim 4 wherein said floor is a function of the level of distortion of said video signal at which a lower level of distortion will not be perceived by a human viewer.

6. The method of claim 4 wherein said floor is substantially at a level of distortion is not perceived by a human viewer.

7. A method of incorporating an auxiliary signal with a variable rate primary signal comprising the steps of:
    encoding the primary signal at a particular level of quantization,
    applying said encoded primary signal to a buffer,
    transmitting said primary signal over a transmission channel at a predetermined output rate,
    setting the level of quantization so that an underflow condition is achieved in said buffer, and
    regulating the auxiliary signal such that portions of the variable auxiliary signal are transmitted over said transmission channel only during said underflow condition,
    establishing a perceptual distortion metric which is responsive to a state of buffer fullness,
    measuring a distortion level associated with the primary signal, and
    establishing a non-zero floor for the distortion level and lowering the perceptual distortion metric so that both are higher than that required for buffer fullness control, such that more frequent buffer underflow conditions occur resulting in more frequent transmission of auxiliary signals.

\* \* \* \* \*